(12) United States Patent
Vassilovski et al.

(10) Patent No.: US 12,225,430 B2
(45) Date of Patent: Feb. 11, 2025

(54) SIDELINK POSITIONING ANCHOR CONFIGURATION

(71) Applicant: QUALCOMM Incorporated, San Diego, CA (US)

(72) Inventors: Dan Vassilovski, Del Mar, CA (US); Kapil Gulati, Belle Mead, NJ (US); Sony Akkarakaran, Poway, CA (US); Hong Cheng, Basking Ridge, NJ (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/305,777

(22) Filed: Jul. 14, 2021

(65) Prior Publication Data

US 2023/0016309 A1 Jan. 19, 2023

(51) Int. Cl.
*H04W 4/029* (2018.01)
*H04W 24/02* (2009.01)
*H04W 72/04* (2023.01)

(52) U.S. Cl.
CPC ........... *H04W 4/029* (2018.02); *H04W 24/02* (2013.01); *H04W 72/04* (2013.01)

(58) Field of Classification Search
CPC ..... H04W 64/00; H04W 92/18; H04W 76/14; H04W 4/40; H04W 8/24; H04W 24/10; H04W 24/02; H04W 4/029; H04W 4/023; H04W 4/46; H04W 4/44; H04W 8/005; H04W 72/56; H04W 56/006; H04W 88/04; H04W 4/00; H04W 4/02; H04W 4/025; H04W 48/10; H04W 60/04; H04W 64/003; H04W 72/121; H04W 72/04; H04W 72/25; H04W 72/51; H04W 72/542; H04W 4/80; H04W 48/12; H04W 72/21; G01S 5/0072; G01S 5/0284; G01S 5/0036; G01S 5/0289
See application file for complete search history.

(56) References Cited

U.S. PATENT DOCUMENTS

2019/0373536 A1* 12/2019 Jayawardene ....... H04B 17/318
2022/0377752 A1* 11/2022 Zhbankov ............. G01S 5/0263

FOREIGN PATENT DOCUMENTS

| WO | WO-2019197036 A1 * | 10/2019 | ........... G01S 5/0072 |
| WO | WO-2020164009 A1 * | 8/2020 | ............ H04W 4/06 |
| WO | WO-2021109346 A1 * | 6/2021 | ........ H04W 72/0406 |
| WO | WO-2021167393 A1 * | 8/2021 | ........... G01S 13/876 |

* cited by examiner

*Primary Examiner* — Marcos L Torres
*Assistant Examiner* — Jing Gao
(74) *Attorney, Agent, or Firm* — Harrity & Harrity, LLP

(57) ABSTRACT

Various aspects of the present disclosure generally relate to wireless communication. In some aspects, a mobile station may receive first information identifying a value for a threshold parameter associated with a sidelink positioning procedure. The mobile station may transmit second information identifying a suitability for anchoring the sidelink positioning procedure, wherein the suitability is associated with the value for the threshold parameter. Numerous other aspects are described.

30 Claims, 13 Drawing Sheets

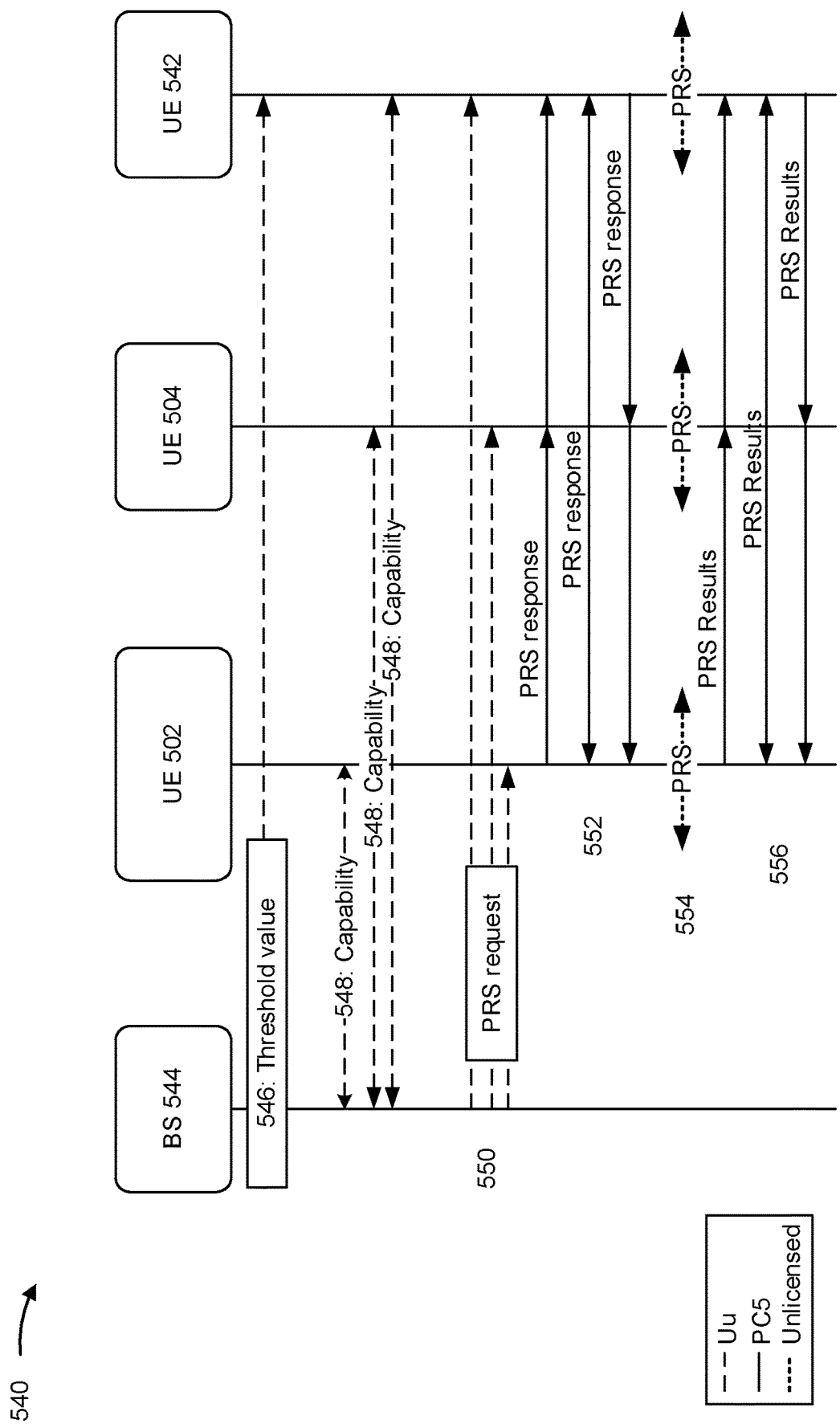

SIDELINK POSITIONING ANCHOR CONFIGURATION

FIELD OF THE DISCLOSURE

Aspects of the present disclosure generally relate to wireless communication and to techniques and apparatuses for sidelink positioning anchor configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include receiving, by the mobile station, first information identifying a value for a threshold parameter associated with a sidelink positioning procedure. The method may include transmitting, by the mobile station, second information identifying a suitability for anchoring the sidelink positioning procedure, wherein the suitability is associated with the value for the threshold parameter.

Some aspects described herein relate to a method of wireless communication performed by a base station. The method may include transmitting, by the base station and to a mobile station, first information identifying a value for a threshold parameter associated with a sidelink positioning procedure. The method may include receiving, by the base station and from the mobile station, second information identifying a suitability for anchoring the sidelink positioning procedure, wherein the suitability is associated with the value for the threshold parameter.

Some aspects described herein relate to a mobile station for wireless communication. The mobile station may include a memory and one or more processors coupled to the memory. The one or more processors may be configured to receive first information identifying a value for a threshold parameter associated with a sidelink positioning procedure. The one or more processors may be configured to transmit second information identifying a suitability for anchoring the sidelink positioning procedure, wherein the suitability is associated with the value for the threshold parameter.

Some aspects described herein relate to a base station for wireless communication. The base station may include a memory and one or more processors coupled to the memory. The one or more processors may be configured to transmit, to a mobile station, first information identifying a value for a threshold parameter associated with a sidelink positioning procedure. The one or more processors may be configured to receive, from the mobile station, second information identifying a suitability for anchoring the sidelink positioning procedure, wherein the suitability is associated with the value for the threshold parameter.

Some aspects described herein relate to a non-transitory computer-readable medium that stores a set of instructions for wireless communication by a mobile station. The set of instructions, when executed by one or more processors of the mobile station, may cause the mobile station to receive first information identifying a value for a threshold parameter associated with a sidelink positioning procedure. The set of instructions, when executed by one or more processors of the mobile station, may cause the mobile station to transmit second information identifying a suitability for anchoring the sidelink positioning procedure, wherein the suitability is associated with the value for the threshold parameter.

Some aspects described herein relate to a non-transitory computer-readable medium that stores a set of instructions for wireless communication by a base station. The set of instructions, when executed by one or more processors of the base station, may cause the base station to transmit, to a mobile station, first information identifying a value for a threshold parameter associated with a sidelink positioning procedure. The set of instructions, when executed by one or more processors of the base station, may cause the base station to receive, from the mobile station, second information identifying a suitability for anchoring the sidelink positioning procedure, wherein the suitability is associated with the value for the threshold parameter.

Some aspects described herein relate to an apparatus for wireless communication. The apparatus may include means for receiving first information identifying a value for a threshold parameter associated with a sidelink positioning procedure. The apparatus may include means for transmitting second information identifying a suitability for anchoring the sidelink positioning procedure, wherein the suitability is associated with the value for the threshold parameter.

Some aspects described herein relate to an apparatus for wireless communication. The apparatus may include means for transmitting, to a mobile station, first information identifying a value for a threshold parameter associated with a sidelink positioning procedure. The apparatus may include means for receiving, from the mobile station, second information identifying a suitability for anchoring the sidelink positioning procedure, wherein the suitability is associated with the value for the threshold parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D are diagrams illustrating examples of sidelink positioning, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
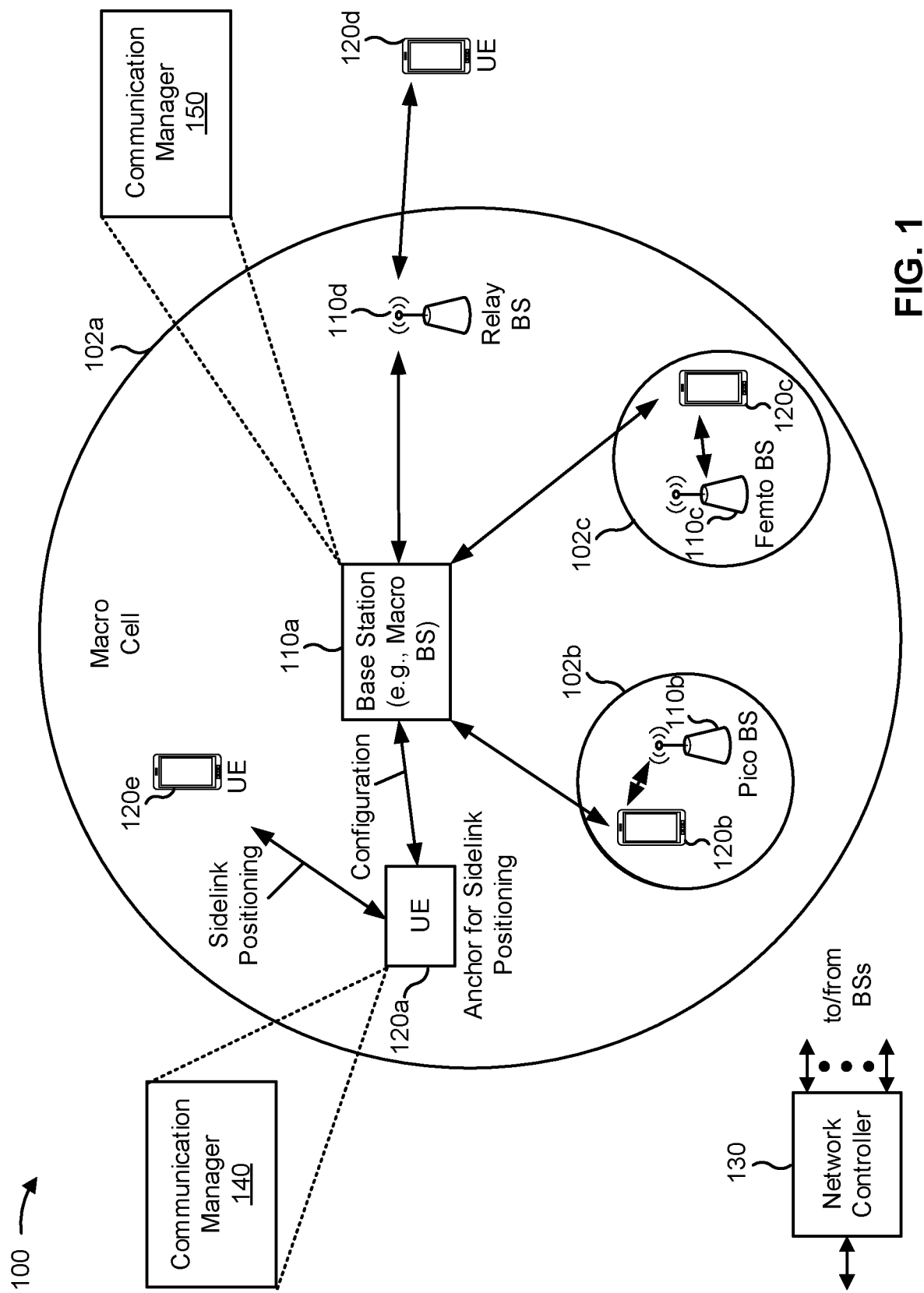
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station, such as the UE 120, may include a communication manager 140. As described in more detail elsewhere herein, the communication manager 140 may receive first information identifying a value for a threshold parameter associated with a sidelink positioning procedure; and transmit second information identifying a suitability for anchoring the sidelink positioning procedure, wherein the suitability is associated with the value for the threshold parameter. Additionally, or alternatively, the communication manager 140 may perform one or more other operations described herein.

In some aspects, the base station 110 may include a communication manager 150. As described in more detail elsewhere herein, the communication manager 150 may transmit, to a mobile station, first information identifying a value for a threshold parameter associated with a sidelink positioning procedure; and receive, from the mobile station, second information identifying a suitability for anchoring the sidelink positioning procedure, wherein the suitability is associated with the value for the threshold parameter. Additionally, or alternatively, the communication manager 150 may perform one or more other operations described herein.

As indicated above, FIG. 1 is provided as an example. Other examples may differ from what is described with regard to FIG. 1.

Figure 2:
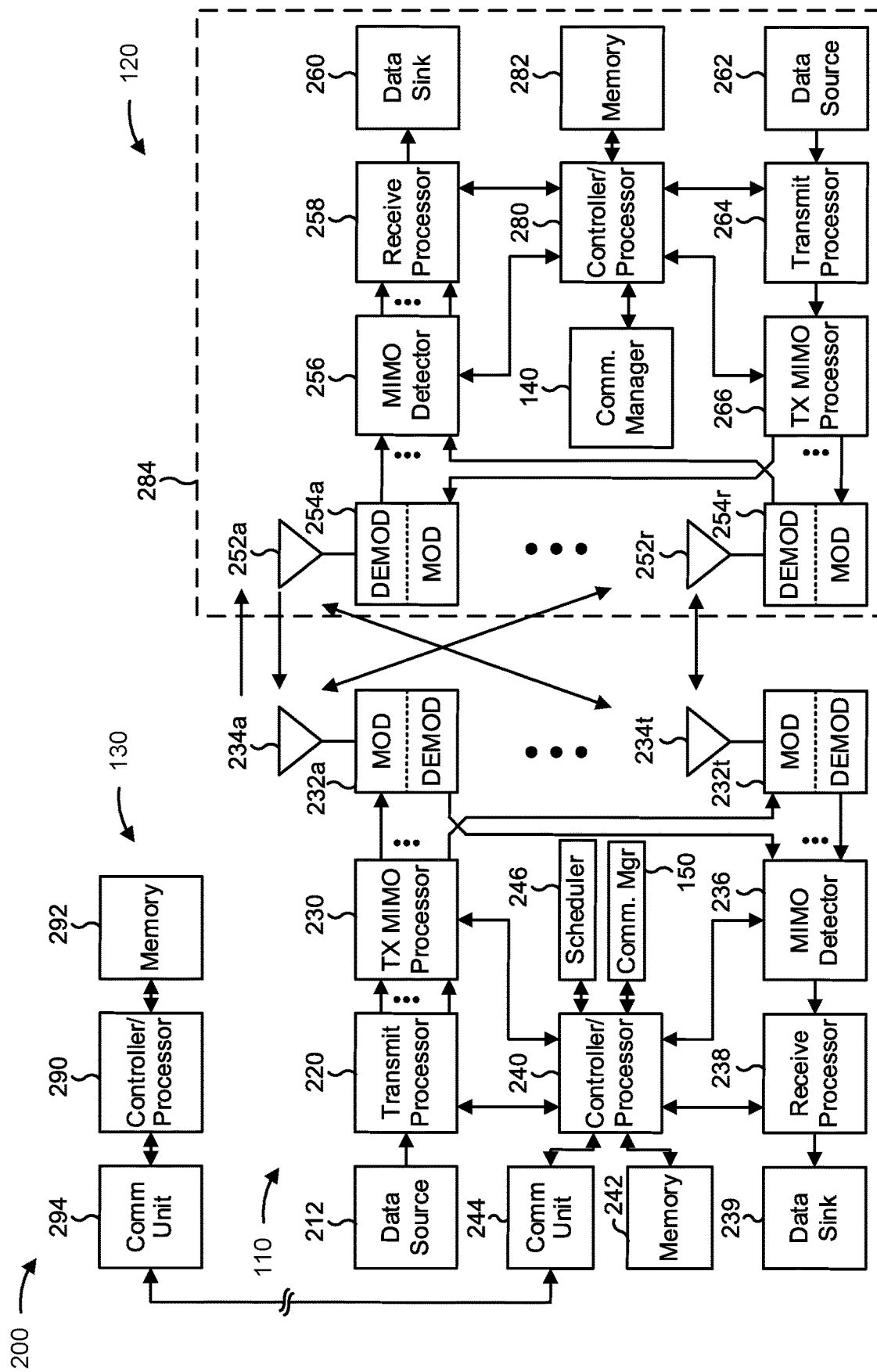
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with sidelink positioning anchor configuration, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a mobile station, such as the UE 120, includes means for receiving first information identifying a value for a threshold parameter associated with a sidelink positioning procedure; and/or means for transmitting second information identifying a suitability for anchoring the sidelink positioning procedure, wherein the suitability is associated with the value for the threshold parameter. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a mobile station, first information identifying a value for a threshold parameter associated with a sidelink positioning procedure; and/or means for receiving, from the mobile station, second information identifying a suitability for anchoring the sidelink positioning procedure, wherein the suitability is associated with the value for the threshold parameter. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
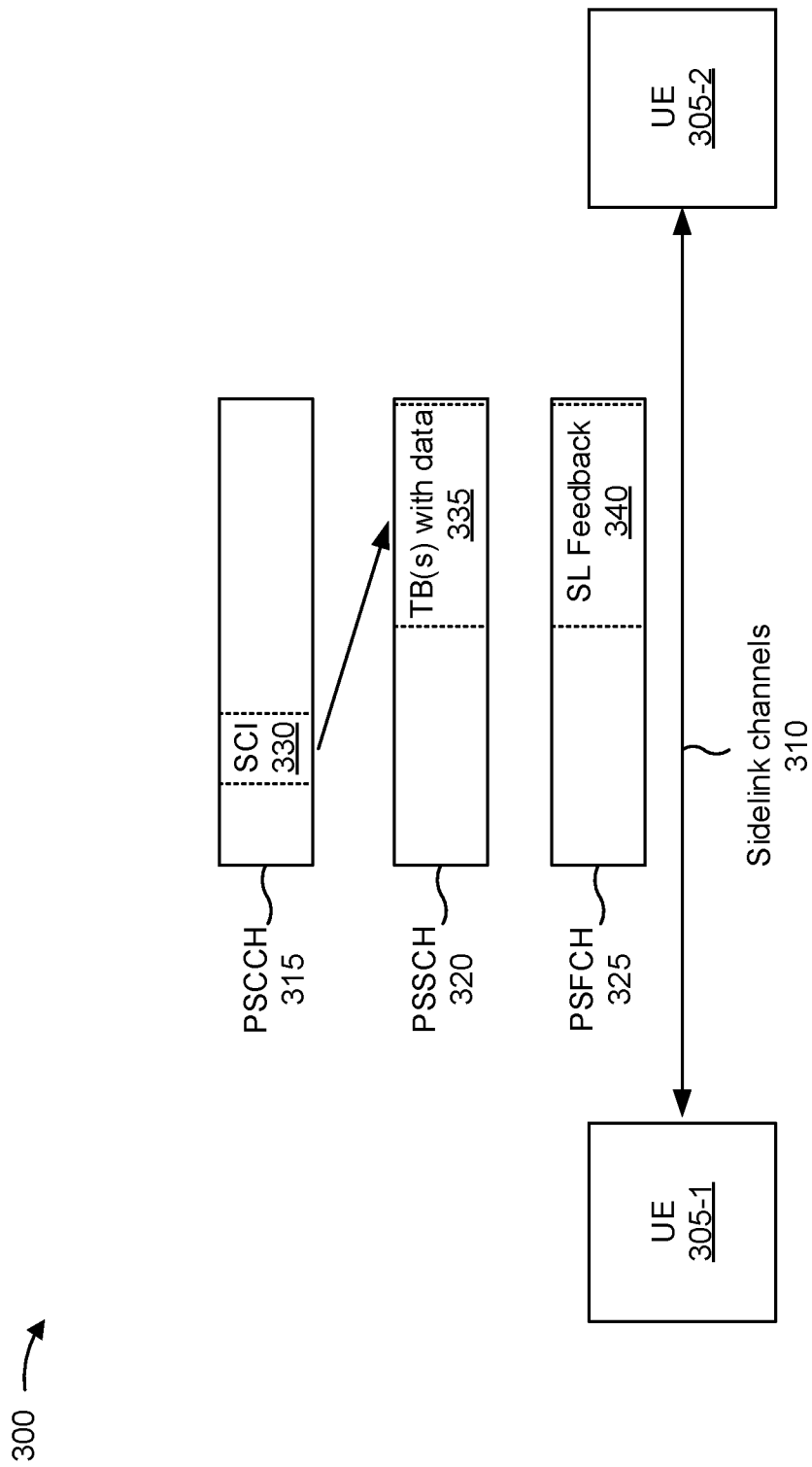
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. For example, a first UE 305-1 may communicate with the second UE 305-2 to perform ranging and determine a relative distance between UEs 305 (e.g., UE 305-1 and/or UE 305-2) or an absolute position for first UE 305-1 or second UE 305-2. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 may correspond to one or more other UEs or mobile stations described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
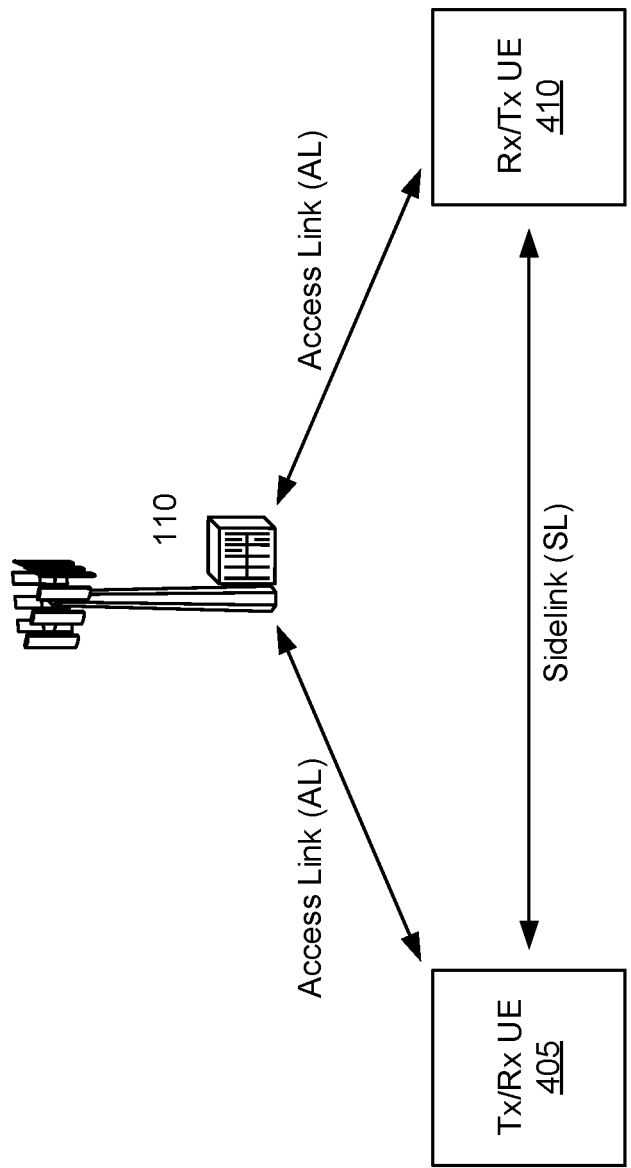
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. For example, as described in more detail herein, a base station 110 may provide configuration information identifying a threshold value for a parameter, such as an anchoring threshold value, to Tx/Rx UE 405. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

FIGS. 5A-5D are diagrams illustrating examples 500/520/540/560 of sidelink positioning, in accordance with the present disclosure.

Figure 5A:
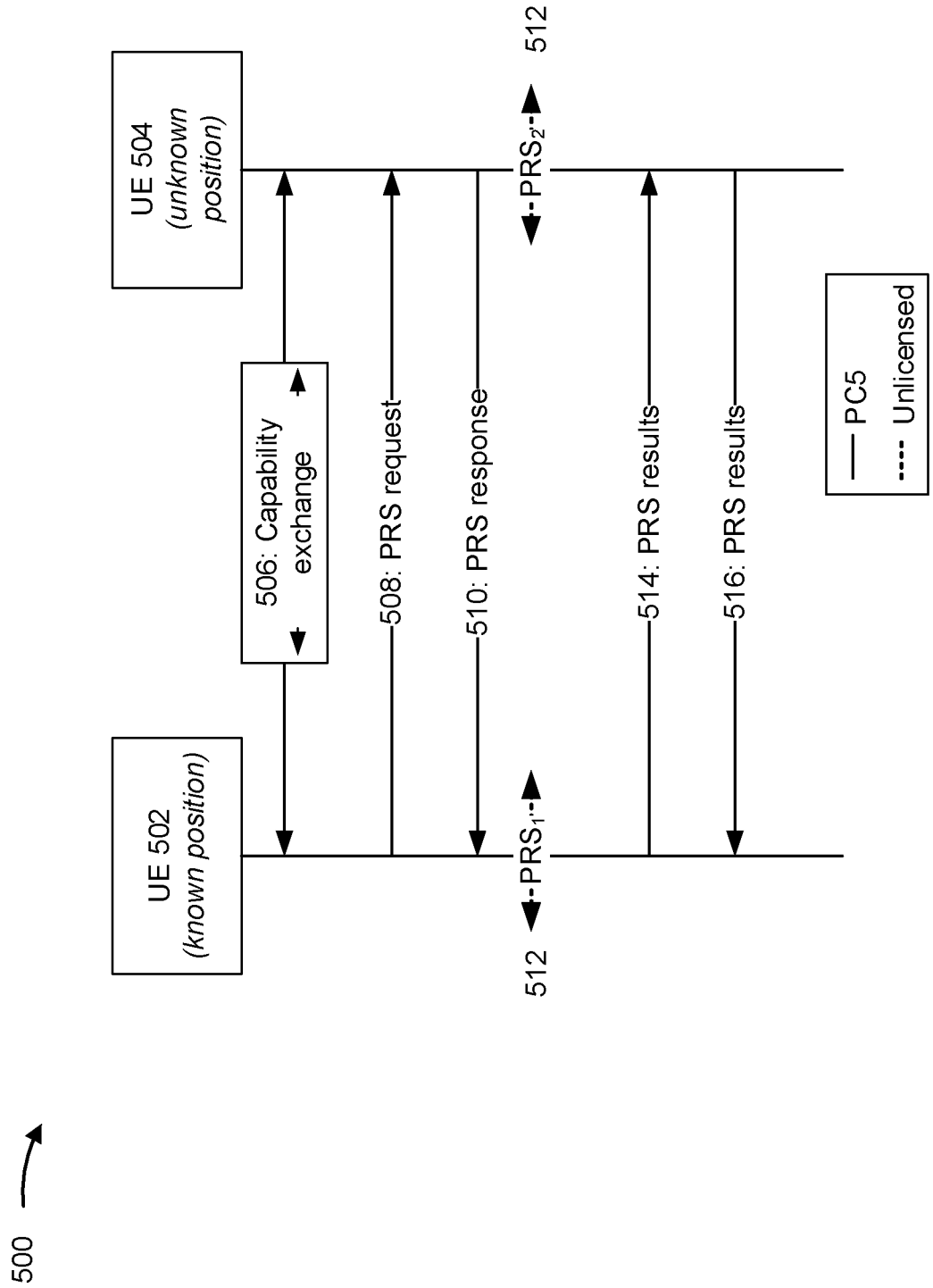

As further shown in FIG. 5A, and by example 500, a first UE 502 may have a known position and serve as an anchor for a sidelink positioning procedure (e.g., a ranging procedure) and a second UE 504 may have an unknown position. At 506, first UE 502 and second UE 504 may communicate to exchange capability information. For example, first UE 502 may indicate that first UE 502 has a known position, thereby enabling second UE 504 to determine a position of second UE 504 based at least in part on the known position of first UE 502. At 508 and 510, first UE 502 may transmit a positioning reference signal (PRS) request and second UE 504 may transmit a PRS response. Based at least in part on the PRS request and PRS response, at 512, first UE 502 and second UE 504 may transmit (e.g., on unlicensed spectrum) respective PRSs (e.g., wideband PRSs). At 514 and 516, after transmitting the respective PRSs, first UE 502 and second UE 504 may exchange information indicating results of the respective PRSs, thereby enabling second UE 504 to determine a position based at least in part on the known position of first UE 502. For example, first UE 502 and/or second UE 504 may transmit information enabling a determination of a round-trip-time (RTT) associated with the respective PRSs, thereby enabling a ranging determination (e.g., a determination of a distance between first UE 502 and second UE 504). In this way, first UE 502 enables second UE 504 to determine an absolute position.

Figure 5B:
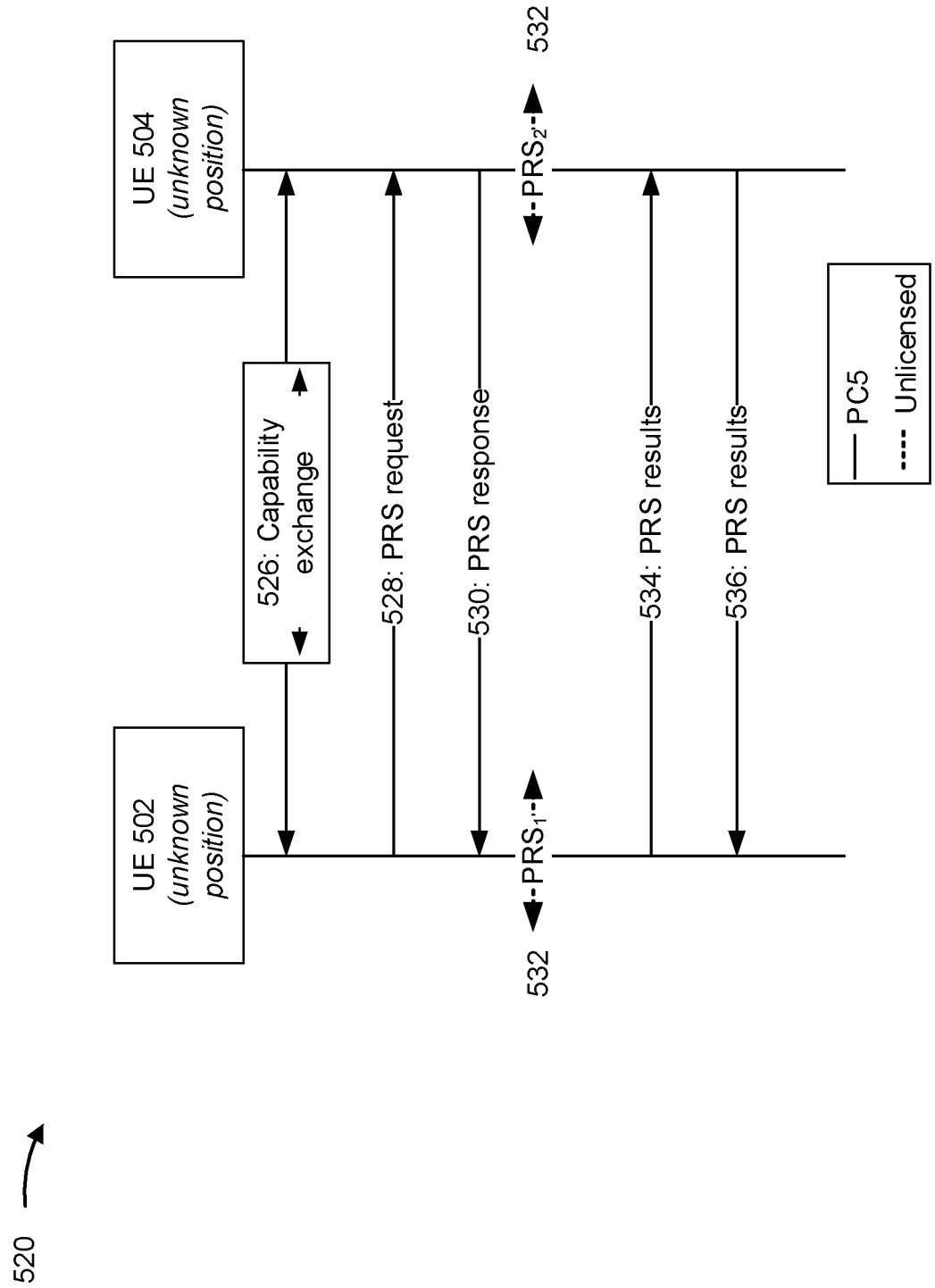

As shown in FIG. 5B, and by example 520, the first UE 502 may have an unknown position and second UE 504 may have an unknown position. In this case, neither first UE 502 nor second UE 504 can serve as an anchor for a sidelink positioning procedure. At 526, first UE 502 and second UE 504 may communicate to exchange capability information.

For example, first UE 502 and second UE 504 may each indicate an unknown position. In this case, first UE 502 and second UE 504 may determine that a result of performing a sidelink positioning procedure will be an inter-UE range (e.g., a distance between first UE 502 and second UE 504) rather than an absolute position (e.g., a position of second UE 504 derived based at least in part on the known position of first UE 502 and a range between UEs 502 and 504). At 528 and 530, first UE 502 may transmit a PRS request and second UE 504 may transmit a PRS response. At 532, first UE 502 and second UE 504 may transmit respective PRSs. At 534 and 536, after transmitting the respective PRSs, first UE 502 and second UE 504 may exchange information indicating results of the respective PRSs, thereby enabling second UE 504 to determine a range between first UE 502 and second UE 504 (e.g., using RTT measurements performed based at least part on transmitting the respective PRSs and receiving the respective PRS results). In this way, first UE 502 and second UE 504 determine a relative position (e.g., an inter-UE range).

Figure 5D:
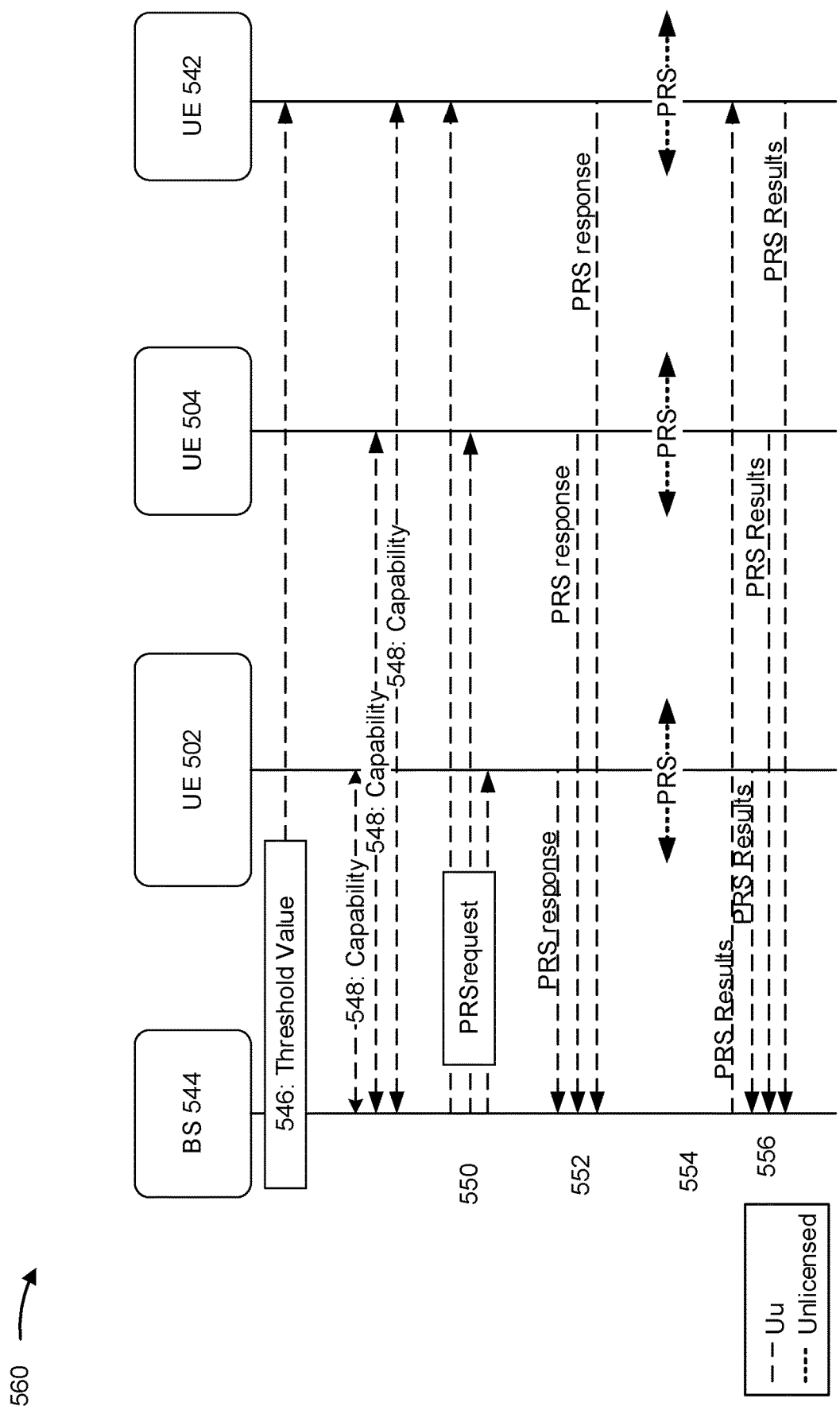

As shown in FIG. 5C, and by example 540, the first UE 502 may have a known position, the second UE 504 may have an unknown position, and a third UE 542 may have an unknown position. A base station 544 may, at 546, provide information identifying an anchor accuracy threshold to the UEs 502/504/542. For example, base station 544 may transmit information on a Uu interface to configure an anchor accuracy threshold. At 548, UEs 502/504/542 may communicate with base station 544 to indicate a capability for serving as an anchor. For example, based on the anchor accuracy threshold and the known position, UE 502 may indicate suitability for serving as an anchor for a sidelink positioning procedure. In contrast, UEs 504/542 may indicate unsuitability for serving as an anchor. At 550, base station 110 may transmit PRS requests to the UEs 502/504/542. At 552/554/556, UEs 502/504/542 may communicate to perform ranging using PRS transmissions. For example, UE 502 may transmit a PRS response (e.g., on a PC5 interface to UEs 504/542) indicating that UE 502 will transmit a PRS, may transmit the PRS, and may receive results of transmitting the PRS from UEs 504/542 enabling a determination of a range. Similarly, UEs 504/542 may transmit PRSs and receive results (e.g., RTT determinations) of transmitting the PRSs. In this case, UEs 504/542 may determine an absolute position based at least in part on the known position of first UE 502, which is serving as anchor for the positioning procedure. As shown in FIG. 5D, in contrast, rather than PRS responses and PRS results being communicated between UEs 502/504/542, the PRS responses and PRS results may be communicated to the base station 544, which may disseminate results of the sidelink positioning procedure.

As indicated above, FIGS. 5A-5D are provided as examples. Other examples may differ from what is described with respect to FIGS. 5A-5D.

As described herein, in non-network-managed sidelink positioning, as described with regard to FIGS. 5A and 5B, a first UE may determine whether the first UE has a known position and use the known position to perform a sidelink positioning procedure with a second UE. However, this may prevent a base station from constraining sidelink positioning procedures in any way. For example, when a large quantity of UEs are communicating in a network, an amount of network traffic associated with sidelink positioning procedures may exceed a threshold amount of traffic, causing latency or dropped communications for other UEs.

In contrast, network-managed sidelink positioning, as described with regard to FIGS. 5C and 5D, a base station may provide a threshold for the first UE to use in determining whether the known position is sufficiently accurate and the first UE may transmit capability information to the base station to indicate that the first UE is capable of serving as an anchor for a sidelink positioning procedure. In this case, the network may initiate the sidelink positioning procedure for the first UE and one or more second UEs based at least in part on the first UE indicating a suitability for serving as an anchor. In this way, the network may constrain an amount of network traffic associated with sidelink positioning procedures. However, this query-based procedure of the network transmitting information identifying a threshold, a UE responding with whether the threshold is satisfied, and the network initiating sidelink positioning procedures may use excessive network resources.

Some aspects described herein enable sidelink positioning anchor configuration. For example, a base station may provide information identifying a threshold for serving as an anchor and, when a first UE determines that location information of the first UE satisfies the threshold, the first UE may autonomously initiate a sidelink positioning procedure with other UEs. In this way, the base station may transmit information elements (IEs) updating the threshold to dynamically constrain which UEs can perform a sidelink position procedure, such as based at least in part on a quantity of UEs communicating in a network. In this way, the base station and the UEs in the network may avoid excessive utilization of network resources from performing a query-based procedure and excessive utilization of network resources from too many UEs attempting to serve as anchors (e.g., in a congested network) for sidelink positioning procedures.

Figure 6:
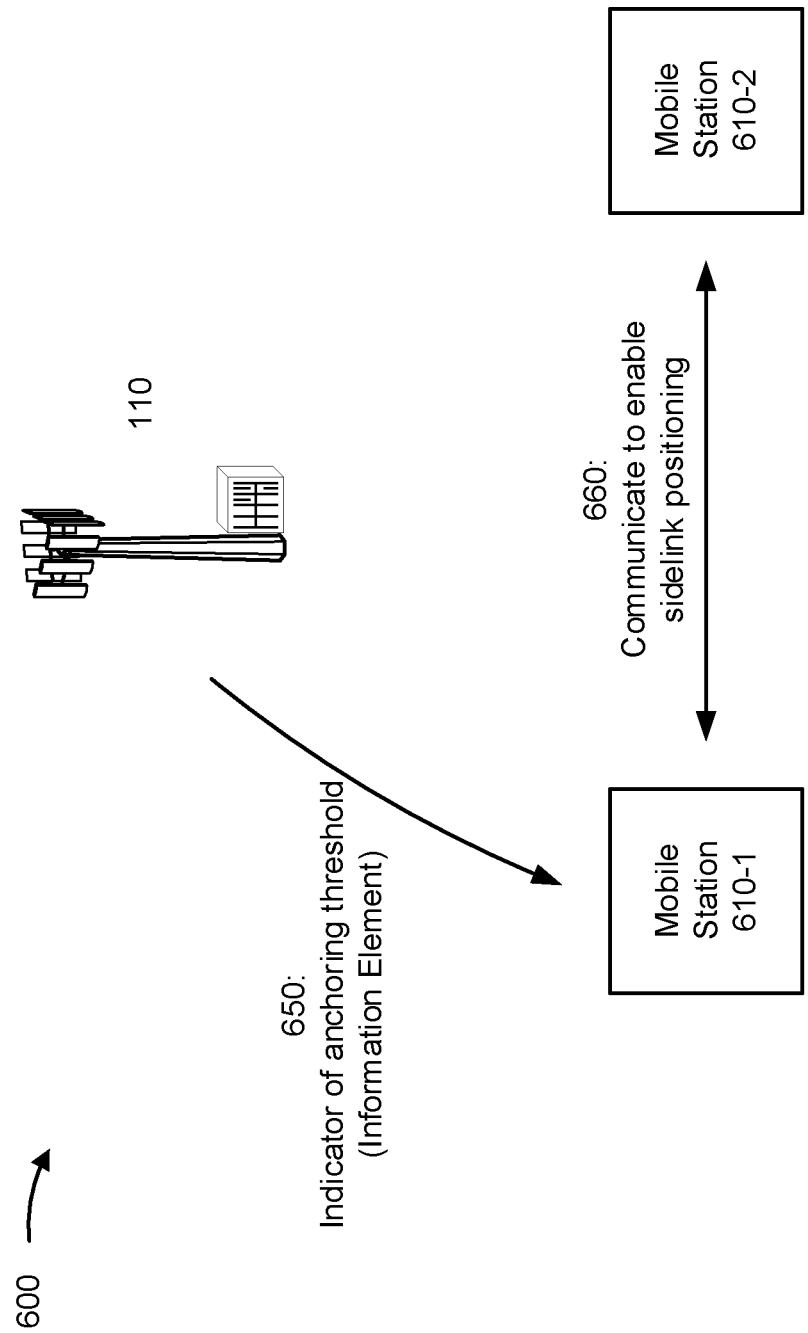
FIG. 6 is a diagram illustrating an example associated with sidelink positioning anchor configuration, in accordance with the present disclosure.

FIG. 6 is a diagram illustrating an example 600 associated with sidelink positioning anchor configuration, in accordance with the present disclosure. As shown in FIG. 6, example 600 includes communication between a base station 110, a mobile station 610-1, and a mobile station 610-2. In some aspects, base station 110 and mobile stations 610 may be included in a wireless network, such as wireless network 100. Base station 110 and mobile stations 610 may communicate via a wireless access link or a wireless sidelink as described in more detail herein.

As further shown in FIG. 6, and by reference number 650, mobile station 610-1 may receive first information identifying a value for a threshold parameter associated with a sidelink positioning procedure. For example, mobile station 610-1 may receive an indicator of a value for an anchoring threshold associated with a determination of whether a mobile station 610 is suitable for serving as an anchor for a sidelink positioning procedure. In some aspects, base station 110 may configure the value for the threshold parameter based at least in part on an amount of network congestion, a quantity of UEs communicating in a network, or another factor.

In some aspects, mobile station 610-1 may receive an indicator of a level of accuracy of a position determination by a mobile station 610 (e.g., mobile station 610-1) that is to be achieved for the mobile station 610 to serve as an anchor for a sidelink positioning procedure. For example, mobile station 610-1 may receive an indication that, for mobile station 610-1 to serve as an anchor, mobile station 610-1 is to have determined an absolute position with a threshold accuracy. In this case, the threshold accuracy may be a threshold latitude location accuracy (e.g., in degrees latitude), a threshold longitude location accuracy (e.g., in degrees longitude), a threshold altitude location accuracy (e.g., in meters), or a combination thereof, among other examples. Additionally, or alternatively, the threshold accuracy may be associated with a temporal duration during which a threshold location accuracy is to be maintained. For example, base station 110 may indicate that for mobile station 610-1 to serve as an anchor, mobile station 110-1 is to have maintained a threshold latitude or longitude location accuracy for a threshold amount of time (e.g., in seconds). In some aspects, mobile station 610 may receive, from base station 110, information identifying a coordinate location, such as in a LocationCoordinates parameter, as defined with regard to 3GPP Technical Specification (TS) 37.355.

In some aspects, base station 110 may transmit the information indicating the value for the threshold parameter in an information element. For example, mobile station 610-1 may receive an information element in a system information block (SIB) message (e.g., an information element in a SIB type 12 (SIB12)), such as a sidelink UE selected configuration (SL-UE-SelectedConfig-r16) information element, which may include other information elements for other purposes. In this case, the information element may include a parameter identifying a sidelink position anchor accuracy (SL-PositionAnchor Accuracy) that mobile station 610-1 is to achieve with respect to one or more types of location accuracy or with respect to a duration, as described herein. Additionally, or alternatively, mobile station 610-1 may receive a SIB including an information element defined for conveying a sidelink position anchor accuracy parameter (SL-UE-PositioningConfig-r16) that is defined to include only one or more information elements relating to configuring sidelink positioning.

In some aspects, base station 110 may transmit the information indicating the value for the threshold parameter in a radio resource control (RRC) message. For example, base station 110 may configure an information element in an RRC message that is defined for other purposes. In this case, a type of RRC reconfiguration message, such as an RRC sidelink dedicated configuration (SL-ConfigDedicatedNR), may include the sidelink UE selected configuration (SL-UE-SelectedConfig-r16). Additionally, or alternatively, base station 110 may set a dedicated information element, in an RRC message (e.g., an RRC reconfiguration message), which is configured for conveying information relating to configuring sidelink positioning.

In some aspects, base station 110 may transmit the information indicating the value for the threshold parameter in a sidelink preconfiguration. For example, base station 110 may include a value for the threshold parameter among pre-configuration parameters by including the sidelink UE selected configuration (SL-UE-SelectedConfig-r16) in a sidelink dedicated configuration (SL-ConfigDedicatedNR-r16). Additionally, or alternatively, base station 110 may set a dedicated information element, in a preconfiguration, which is configured for conveying information relating to configuring sidelink positioning.

In some aspects, base station 110 may transmit the information indicating the value for the threshold parameter in another type of message. For example, base station 110 may configure a medium access control (MAC) control element (CE) to identify the threshold parameter. In this case, the MAC CE may be a MAC CE that is configured for other purposes or a dedicated MAC CE.

As further shown in FIG. 6, and by reference number 660, mobile stations 610-1 and 610-2 may communicate to perform a sidelink positioning procedure. For example, mobile station 610-1 may determine that positioning information stored by mobile station 610-1 satisfies a threshold accuracy and may transmit second information (e.g., to mobile station 610-2) indicating that mobile station 610-1 may serve as an anchor for the sidelink positioning procedure. In this case, as described herein, mobile station 610-1 and mobile station 610-2 may transmit PRSs, among other signaling, to enable mobile station 610-2 to determine an absolute position based at least in part on information received from mobile station 610-1 and/or other mobile stations. In some aspects, mobile station 610-1 may initiate a sidelink positioning procedure based at least in part on determining that mobile station 610-1 can serve as an anchor for the sidelink positioning procedure.

Additionally, or alternatively, mobile station 610-1 may determine that positioning information stored by mobile station 610-1 does not satisfy the threshold accuracy. In this case, mobile station 610-1 may transmit second information indicating that mobile station 610-1 cannot serve as an anchor for the sidelink positioning procedure. In this case, mobile stations 610-1 and 610-2 may identify another mobile station that can serve as an anchor or may determine a relative position without an anchor.

In some aspects, mobile station 610-1 may periodically update whether mobile station 610-1 can serve as an anchor for a sidelink positioning procedure. For example, when a location accuracy of mobile station 610-1 changes (e.g., from better than a threshold accuracy to worse than the threshold accuracy), mobile station 610-1 may transmit a message (e.g., an RRC message or a MAC CE) with an information element (e.g., an information element in a sidelink UE information message (SidelinkUEInformationNR)) identifying a change to the location accuracy (e.g., in a sidelink position anchor accuracy information element (sl-PositionAnchorAccuracy)).

As indicated above, FIG. 6 is provided as an example. Other examples may differ from what is described with respect to FIG. 6.

Figure 7:
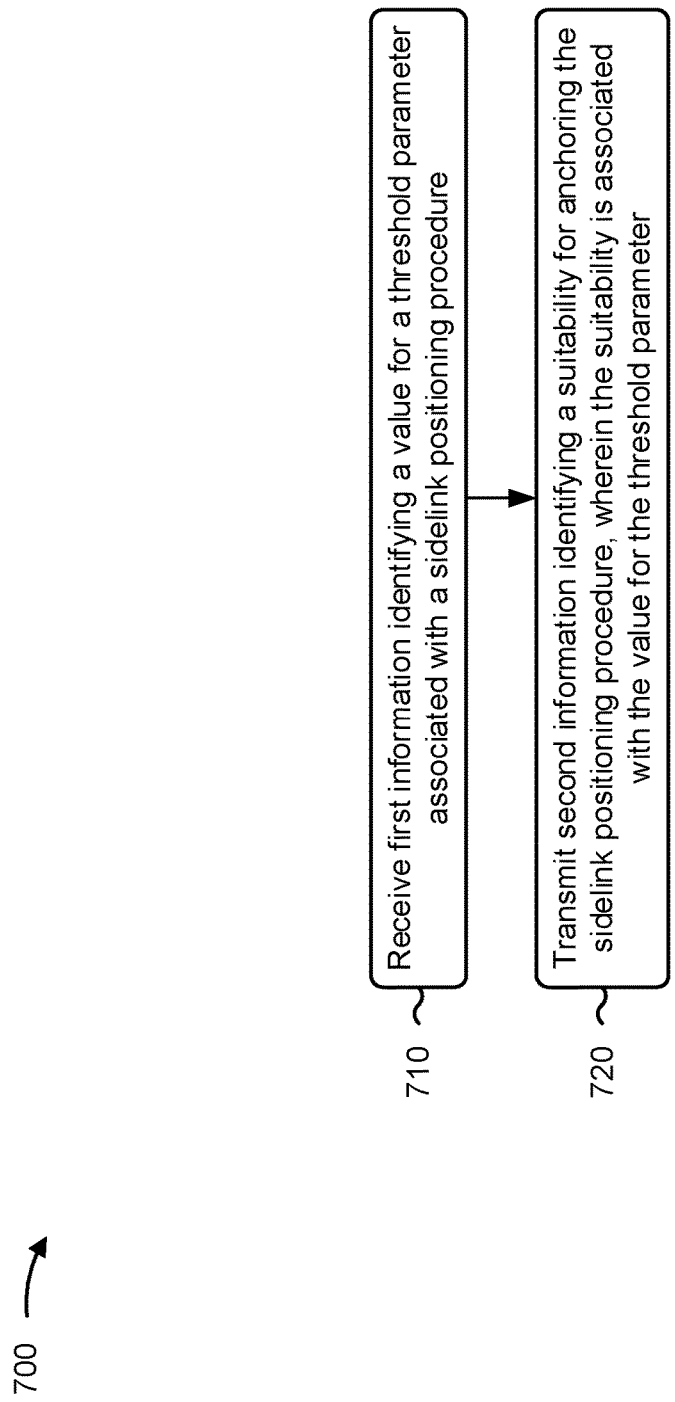
FIGS. 7-8 are diagrams illustrating example processes associated with sidelink positioning anchor configuration, in accordance with the present disclosure.

FIG. 7 is a diagram illustrating an example process 700 performed, for example, by a mobile station, in accordance with the present disclosure. Example process 700 is an example where the mobile station (e.g., the UE 120 or a mobile station 610, among other examples) performs operations associated with sidelink positioning anchor configuration.

As shown in FIG. 7, in some aspects, process 700 may include receiving first information identifying a value for a threshold parameter associated with a sidelink positioning procedure (block 710). For example, the mobile station (e.g., using communication manager 140 and/or reception component 902, depicted in FIG. 9) may receive first information identifying a value for a threshold parameter associated with a sidelink positioning procedure, as described above.

As further shown in FIG. 7, in some aspects, process 700 may include transmitting second information identifying a suitability for anchoring the sidelink positioning procedure, wherein the suitability is associated with the value for the threshold parameter (block 720). For example, the mobile station (e.g., using communication manager 140 and/or transmission component 904, depicted in FIG. 9) may transmit second information identifying a suitability for anchoring the sidelink positioning procedure, wherein the suitability is associated with the value for the threshold parameter, as described above.

Process 700 may include additional aspects, such as any single aspect or any combination of aspects described below and/or in connection with one or more other processes described elsewhere herein.

In a first aspect, the first information is conveyed in an information element.

In a second aspect, alone or in combination with the first aspect, the threshold parameter is at least one of a latitude location accuracy, a longitude location accuracy, an altitude location accuracy, a temporal duration during which location accuracy is to be maintained, or a coordinate location accuracy.

In a third aspect, alone or in combination with one or more of the first and second aspects, the first information comprises a plurality of fields identifying a plurality of values for a plurality of threshold parameters associated with the sidelink positioning procedure.

In a fourth aspect, alone or in combination with one or more of the first through third aspects, the first information is conveyed in a cell-wide mobile station configuration message.

In a fifth aspect, alone or in combination with one or more of the first through fourth aspects, the cell-wide mobile station configuration message is a system information block information element identifying a group of configurations for mobile stations or identifying a single configuration for mobile stations.

In a sixth aspect, alone or in combination with one or more of the first through fifth aspects, the first information is conveyed in an information element of a radio resource control reconfiguration message or in a medium access control (MAC) control element.

In a seventh aspect, alone or in combination with one or more of the first through sixth aspects, the information element of the radio resource control reconfiguration message identifies a group of configurations for the mobile station or identifies a single configuration for the mobile station.

In an eighth aspect, alone or in combination with one or more of the first through seventh aspects, the first information is conveyed in an information element that includes a sidelink preconfiguration.

In a ninth aspect, alone or in combination with one or more of the first through eighth aspects, the information element identifies a group of configurations for the mobile station or identifies a single configuration for the mobile station.

In a tenth aspect, alone or in combination with one or more of the first through ninth aspects, process 700 includes transmitting, by the mobile station, third information identifying a change to the suitability for anchoring the sidelink positioning procedure.

In an eleventh aspect, alone or in combination with one or more of the first through tenth aspects, the third information is conveyed in an information element of a radio resource control message.

In a twelfth aspect, alone or in combination with one or more of the first through eleventh aspects, process 700 includes anchoring the sidelink positioning procedure based at least in part on the second information indicating that the mobile station is suitable for anchoring the sidelink positioning procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
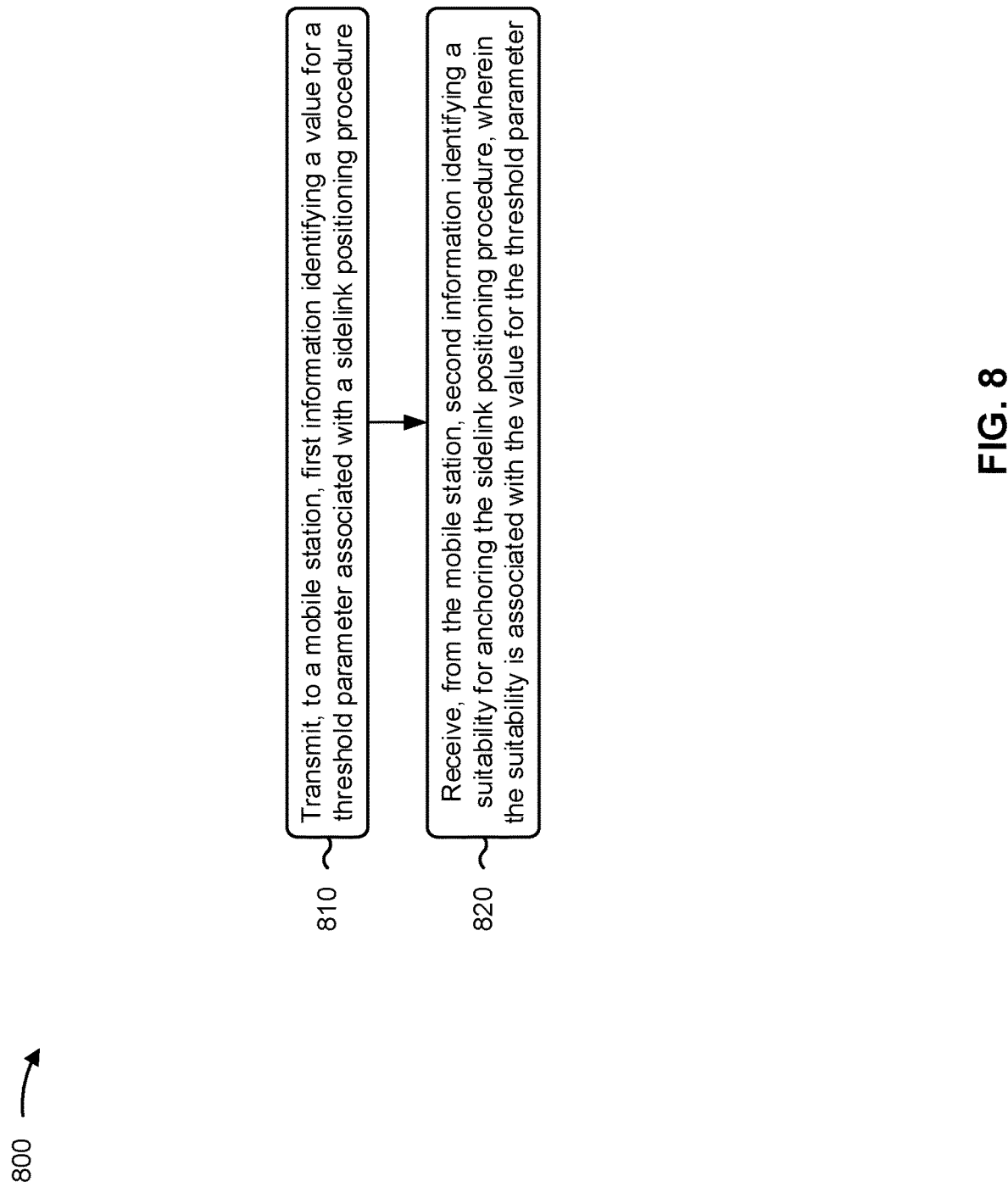

FIG. 8 is a diagram illustrating an example process 800 performed, for example, by a base station, in accordance with the present disclosure. Example process 800 is an example where the base station (e.g., base station 110) performs operations associated with sidelink positioning anchor configuration.

As shown in FIG. 8, in some aspects, process 800 may include transmitting, to a mobile station, first information identifying a value for a threshold parameter associated with a sidelink positioning procedure (block 810). For example, the base station (e.g., using communication manager 150 and/or transmission component 1004, depicted in FIG. 10) may transmit, to a mobile station, first information identifying a value for a threshold parameter associated with a sidelink positioning procedure, as described above.

As further shown in FIG. 8, in some aspects, process 800 may include receiving, from the mobile station, second information identifying a suitability for anchoring the sidelink positioning procedure, wherein the suitability is associated with the value for the threshold parameter (block 820). For example, the base station (e.g., using communication manager 150 and/or reception component 1002, depicted in FIG. 10) may receive, from the mobile station, second information identifying a suitability for anchoring the sidelink positioning procedure, wherein the suitability is associated with the value for the threshold parameter, as described above.

Process 800 may include additional aspects, such as any single aspect or any combination of aspects described below and/or in connection with one or more other processes described elsewhere herein.

In a first aspect, the first information is conveyed in an information element.

In a second aspect, alone or in combination with the first aspect, the threshold parameter is at least one of a latitude location accuracy, a longitude location accuracy, an altitude location accuracy, a temporal duration during which location accuracy is to be maintained, or a coordinate location accuracy.

In a third aspect, alone or in combination with one or more of the first and second aspects, the first information comprises a plurality of fields identifying a plurality of values for a plurality of threshold parameters associated with the sidelink positioning procedure.

In a fourth aspect, alone or in combination with one or more of the first through third aspects, the first information is conveyed in a cell-wide mobile station configuration message.

In a fifth aspect, alone or in combination with one or more of the first through fourth aspects, the cell-wide mobile station configuration message is a system information block information element identifying a group of configurations for mobile stations or identifying a single configuration for mobile stations.

In a sixth aspect, alone or in combination with one or more of the first through fifth aspects, the first information is conveyed in an information element of a radio resource control reconfiguration message or in a MAC control element.

In a seventh aspect, alone or in combination with one or more of the first through sixth aspects, the information element of the radio resource control reconfiguration message identifies a group of configurations for the mobile station or identifies a single configuration for the mobile station.

In an eighth aspect, alone or in combination with one or more of the first through seventh aspects, the first information is conveyed in an information element that includes a sidelink preconfiguration.

In a ninth aspect, alone or in combination with one or more of the first through eighth aspects, the information element identifies a group of configurations for the mobile station or identifies a single configuration for the mobile station.

In a tenth aspect, alone or in combination with one or more of the first through ninth aspects, process 800 includes receiving, by the base station, third information identifying a change to the suitability for anchoring the sidelink positioning procedure.

In an eleventh aspect, alone or in combination with one or more of the first through tenth aspects, the third information is conveyed in an information element of a radio resource control message.

In a twelfth aspect, alone or in combination with one or more of the first through eleventh aspects, process 800 includes anchoring the sidelink positioning procedure based at least in part on the second information indicating that the mobile station is suitable for anchoring the sidelink positioning procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
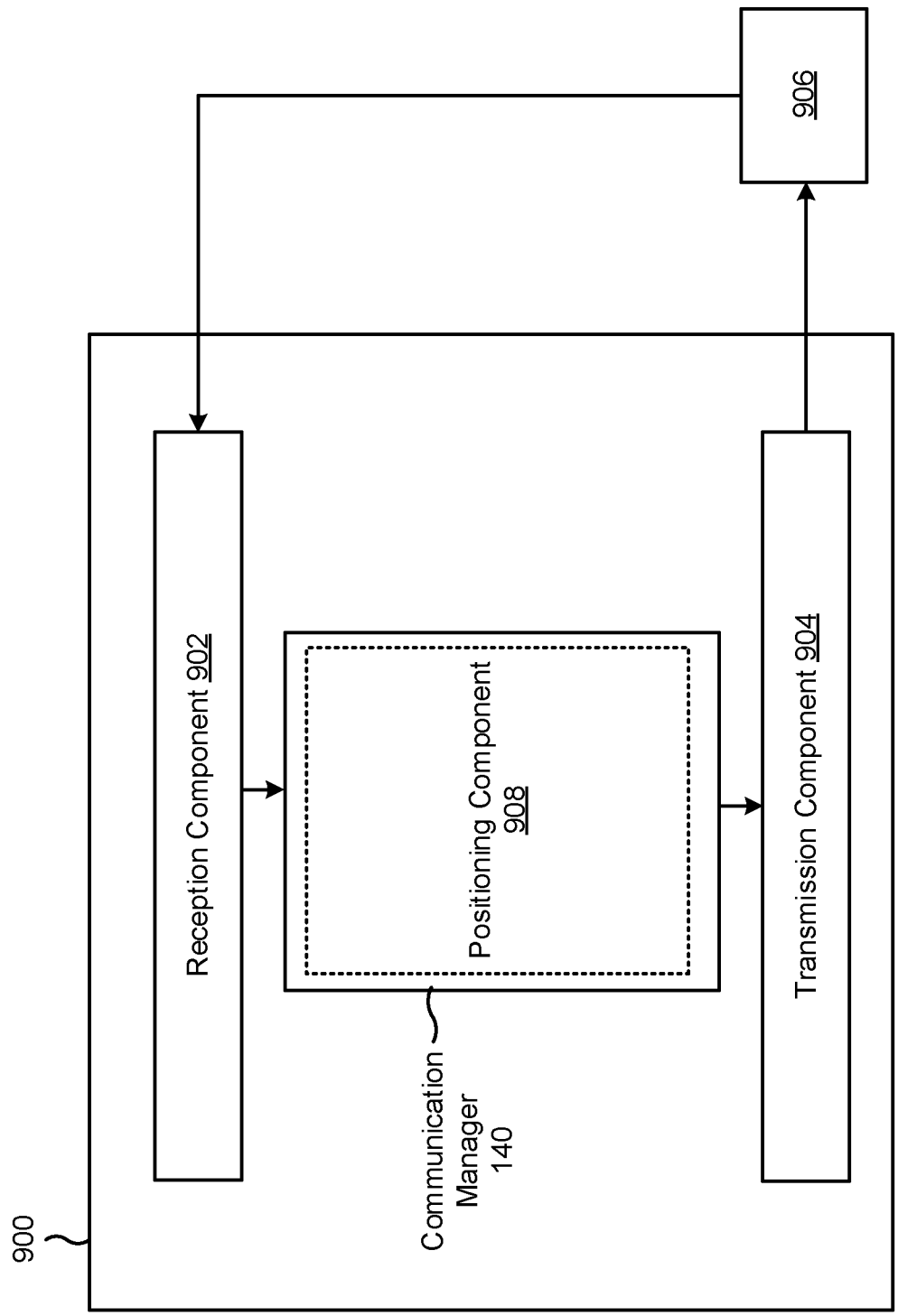
FIGS. 9-10 are diagrams of example apparatuses for wireless communication, in accordance with the present disclosure.

FIG. 9 is a diagram of an example apparatus 900 for wireless communication. The apparatus 900 may be a mobile station, or a mobile station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a positioning component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the mobile station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the mobile station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the mobile station described in connection with FIG. 2. In some aspects, the transmission component 904 may be co-located with the reception component 902 in a transceiver.

The reception component 902 may receive first information identifying a value for a threshold parameter associated with a sidelink positioning procedure. The transmission component 904 may transmit second information identifying a suitability for anchoring the sidelink positioning procedure, wherein the suitability is associated with the value for the threshold parameter. The transmission component 904 may transmit third information identifying a change to the suitability for anchoring the sidelink positioning procedure. The positioning component 908 may anchor the sidelink positioning procedure based at least in part on the second information indicating that the mobile station is suitable for anchoring the sidelink positioning procedure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
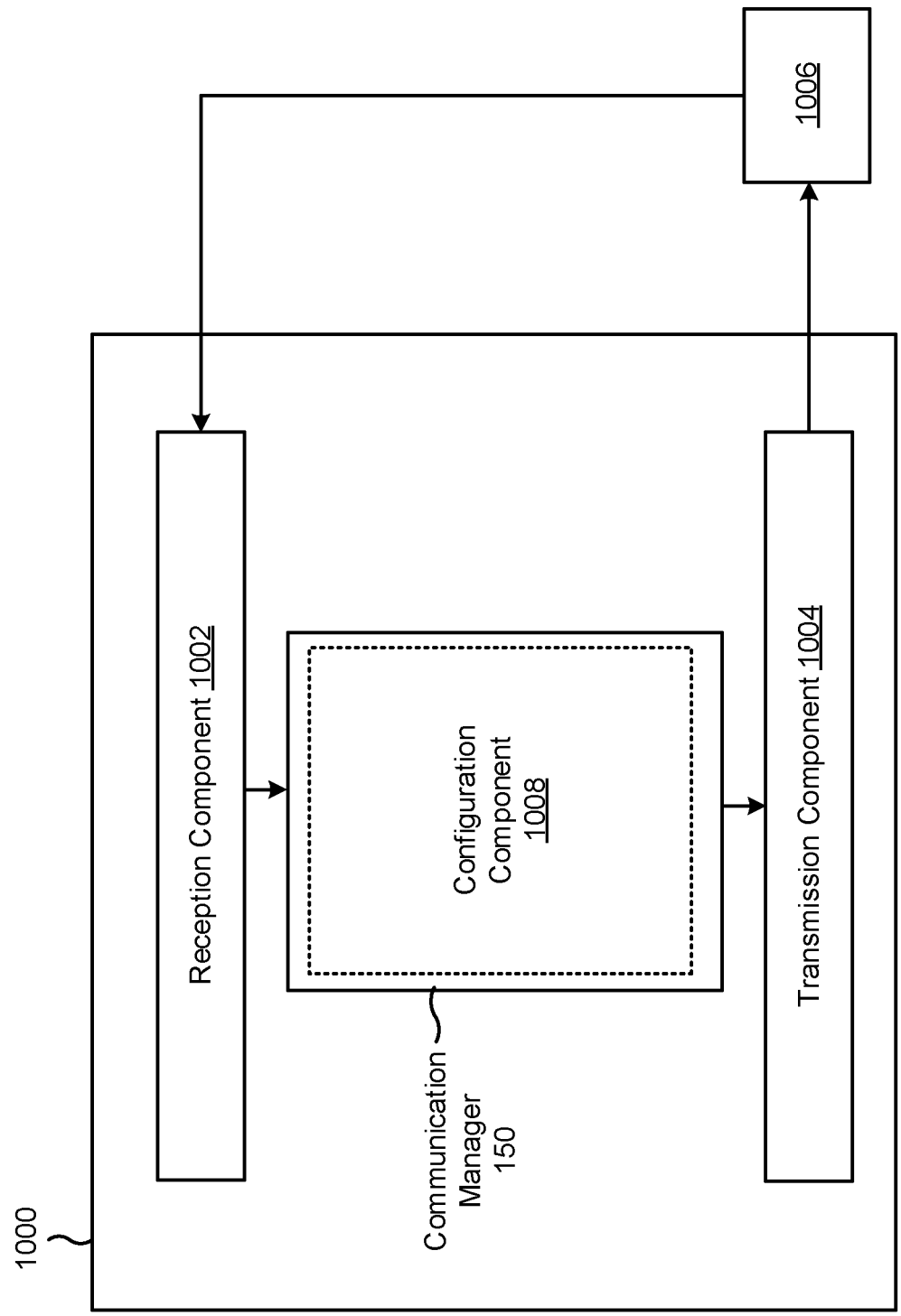

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a mobile station, first information identifying a value for a threshold parameter associated with a sidelink positioning procedure. The reception component 1002 may receive, from the mobile station, second information identifying a suitability for anchoring the sidelink positioning procedure, wherein the suitability is associated with the value for the threshold parameter. The reception component 1002 may receive third information identifying a change to the suitability for anchoring the sidelink positioning procedure. The configuration component 1008 may configure the value for the threshold parameter.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a mobile station, comprising: receiving, by the mobile station, first information identifying a value for a threshold parameter associated with a sidelink positioning procedure; and transmitting, by the mobile station, second information identifying a suitability for anchoring the sidelink positioning procedure, wherein the suitability is associated with the value for the threshold parameter.

Aspect 2: The method of Aspect 1, wherein the first information is conveyed in an information element.

Aspect 3: The method of any of Aspects 1 to 2, wherein the threshold parameter is at least one of: a latitude location accuracy, a longitude location accuracy, an altitude location accuracy, a temporal duration during which location accuracy is to be maintained, or a coordinate location accuracy.

Aspect 4: The method of any of Aspects 1 to 3, wherein the first information comprises a plurality of fields identifying a plurality of values for a plurality of threshold parameters associated with the sidelink positioning procedure.

Aspect 5: The method of any of Aspects 1 to 4, wherein the first information is conveyed in a cell-wide mobile station configuration message.

Aspect 6: The method of Aspect 5, wherein the cell-wide mobile station configuration message is a system information block information element identifying a group of configurations for mobile stations or identifying a single configuration for mobile stations.

Aspect 7: The method of any of Aspects 1 to 4, wherein the first information is conveyed in an information element of a radio resource control reconfiguration message or in a medium access control (MAC) control element.

Aspect 8: The method of Aspect 7, wherein the information element of the radio resource control reconfiguration message identifies a group of configurations for the mobile station or identifies a single configuration for the mobile station.

Aspect 9: The method of any of Aspects 1 to 4, wherein the first information is conveyed in an information element that includes a sidelink preconfiguration.

Aspect 10: The method of Aspect 9, wherein the information element identifies a group of configurations for the mobile station or identifies a single configuration for the mobile station.

Aspect 11: The method of any of Aspects 1 to 10, further comprising: transmitting, by the mobile station, third information identifying a change to the suitability for anchoring the sidelink positioning procedure.

Aspect 12: The method of Aspect 11, wherein the third information is conveyed in an information element of a radio resource control message.

Aspect 13: The method of any of Aspects 1 to 12, further comprising: anchoring the sidelink positioning procedure based at least in part on the second information indicating that the mobile station is suitable for anchoring the sidelink positioning procedure.

Aspect 14: A method of wireless communication performed by a base station, comprising: transmitting, by the base station and to a mobile station, first information identifying a value for a threshold parameter associated with a sidelink positioning procedure; and receiving, by the base station and from the mobile station, second information identifying a suitability for anchoring the sidelink positioning procedure, wherein the suitability is associated with the value for the threshold parameter.

Aspect 15: The method of Aspect 14, wherein the first information is conveyed in an information element.

Aspect 16: The method of any of Aspects 14 to 15, wherein the threshold parameter is at least one of: a latitude location accuracy, a longitude location accuracy, an altitude location accuracy, a temporal duration during which location accuracy is to be maintained, or a coordinate location accuracy.

Aspect 17: The method of any of Aspects 14 to 16, wherein the first information comprises a plurality of fields identifying a plurality of values for a plurality of threshold parameters associated with the sidelink positioning procedure.

Aspect 18: The method of any of Aspects 14 to 17, wherein the first information is conveyed in a cell-wide mobile station configuration message.

Aspect 19: The method of Aspect 18, wherein the cell-wide mobile station configuration message is a system information block information element identifying a group of configurations for mobile stations or identifying a single configuration for mobile stations.

Aspect 20: The method of any of Aspects 14 to 17, wherein the first information is conveyed in an information element of a radio resource control reconfiguration message or in a medium access control (MAC) control element.

Aspect 21: The method of Aspect 20, wherein the information element of the radio resource control reconfiguration message identifies a group of configurations for the mobile station or identifies a single configuration for the mobile station.

Aspect 22: The method of any of Aspects 14 to 17, wherein the first information is conveyed in an information element that includes a sidelink preconfiguration.

Aspect 23: The method of Aspect 22, wherein the information element identifies a group of configurations for the mobile station or identifies a single configuration for the mobile station.

Aspect 24: The method of any of Aspects 14 to 23, further comprising: receiving, by the base station, third information identifying a change to the suitability for anchoring the sidelink positioning procedure.

Aspect 25: The method of Aspect 24, wherein the third information is conveyed in an information element of a radio resource control message.

Aspect 26: An apparatus for wireless communication at a device, comprising a processor; memory coupled with the processor; and instructions stored in the memory and executable by the processor to cause the apparatus to perform the method of one or more of Aspects 1-13

Aspect 27: A device for wireless communication, comprising a memory and one or more processors coupled to the memory, the one or more processors configured to perform the method of one or more of Aspects 1-13.

Aspect 28: An apparatus for wireless communication, comprising at least one means for performing the method of one or more of Aspects 1-13.

Aspect 29: A non-transitory computer-readable medium storing code for wireless communication, the code comprising instructions executable by a processor to perform the method of one or more of Aspects 1-13.

Aspect 30: A non-transitory computer-readable medium storing a set of instructions for wireless communication, the set of instructions comprising one or more instructions that, when executed by one or more processors of a device, cause the device to perform the method of one or more of Aspects 1-13.

Aspect 31: An apparatus for wireless communication at a device, comprising a processor; memory coupled with the processor; and instructions stored in the memory and executable by the processor to cause the apparatus to perform the method of one or more of Aspects 14-25.

Aspect 32: A device for wireless communication, comprising a memory and one or more processors coupled to the memory, the one or more processors configured to perform the method of one or more of Aspects 14-25.

Aspect 33: An apparatus for wireless communication, comprising at least one means for performing the method of one or more of Aspects 14-25.

Aspect 34: A non-transitory computer-readable medium storing code for wireless communication, the code comprising instructions executable by a processor to perform the method of one or more of Aspects 14-25.

Aspect 35: A non-transitory computer-readable medium storing a set of instructions for wireless communication, the set of instructions comprising one or more instructions that, when executed by one or more processors of a device, cause the device to perform the method of one or more of Aspects 14-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
    one or more memories; and
    one or more processors, coupled to the one or more memories, configured to:
        receive a value for a threshold parameter corresponding to a sidelink positioning procedure, wherein the threshold parameter comprises a temporal duration indicative of a threshold amount of time a threshold accuracy of a position determination is to be satisfied for the mobile station to serve as an anchor for the sidelink positioning procedure; and
        transmit information identifying a suitability for anchoring the sidelink positioning procedure, wherein the suitability is based at least in part on the received value for the threshold parameter.

2. The mobile station of claim 1, wherein the received value for the threshold parameter is conveyed in an information element.

3. The mobile station of claim 1, wherein the threshold parameter further comprises at least one of:
    a latitude location accuracy,
    a longitude location accuracy,
    an altitude location accuracy, or
    a coordinate location accuracy.

4. The mobile station of claim 1, wherein the received value for the threshold parameter corresponds to information received by the mobile station, and wherein the information received by the mobile station comprises a plurality of fields identifying a plurality of values for a plurality of threshold parameters associated with the sidelink positioning procedure, the plurality of threshold parameters including the threshold parameter, and the plurality of values including the received value for the threshold parameter.

5. The mobile station of claim 1, wherein the received value for the threshold parameter is conveyed in a cell-wide mobile station configuration message.

6. The mobile station of claim 5, wherein the cell-wide mobile station configuration message is a system information block information element identifying a group of configurations for mobile stations or identifying a single configuration for mobile stations.

7. The mobile station of claim 1, wherein the received value for the threshold parameter is conveyed in an information element of a radio resource control reconfiguration message or in a medium access control (MAC) control element.

8. The mobile station of claim 7, wherein the information element of the radio resource control reconfiguration message identifies a group of configurations for the mobile station or identifies a single configuration for the mobile station.

9. The mobile station of claim 1, wherein the received value for the threshold parameter is conveyed in an information element that includes a sidelink preconfiguration.

10. The mobile station of claim 9, wherein the information element identifies a group of configurations for the mobile station or identifies a single configuration for the mobile station.

11. The mobile station of claim 1, wherein the one or more processors are further configured to:
  transmit additional information identifying a change to the suitability for anchoring the sidelink positioning procedure.

12. The mobile station of claim 11, wherein the additional information is conveyed in an information element of a radio resource control message.

13. The mobile station of claim 1, wherein the one or more processors are further configured to:
  anchor the sidelink positioning procedure based at least in part on the information indicating that the mobile station is suitable for anchoring the sidelink positioning procedure.

14. A network entity for wireless communication, comprising:
  one or more memories; and
  one or more processors, coupled to the one or more memories, configured to:
    transmit, to a mobile station, a value for a threshold parameter corresponding to a sidelink positioning procedure, wherein the threshold parameter comprises a temporal duration indicative of a threshold amount of time a threshold accuracy of a position determination is to be satisfied for the mobile station to serve as an anchor for the sidelink positioning procedure; and
    receive, from the mobile station, information identifying a suitability for anchoring the sidelink positioning procedure, wherein the suitability is based at least in part on the transmitted value for the threshold parameter.

15. The network entity of claim 14, wherein the transmitted value for the threshold parameter is conveyed in an information element.

16. The network entity of claim 14, wherein the threshold parameter further comprises at least one of:
  a latitude location accuracy,
  a longitude location accuracy,
  an altitude location accuracy, or
  a coordinate location accuracy.

17. The network entity of claim 14, wherein the transmitted value for the threshold parameter corresponds to information transmitted by the network entity, and wherein the first information transmitted by the network entity comprises a plurality of fields identifying a plurality of values for a plurality of threshold parameters associated with the sidelink positioning procedure, the plurality of threshold parameters including the threshold parameter, and the plurality of values including the transmitted value for the threshold parameter.

18. The network entity of claim 14, wherein the transmitted value for the threshold parameter is conveyed in a cell-wide mobile station configuration message.

19. The network entity of claim 18, wherein the cell-wide mobile station configuration message is a system information block information element identifying a group of configurations for mobile stations or identifying a single configuration for mobile stations.

20. The network entity of claim 14, wherein the transmitted value for the threshold parameter is conveyed in an information element of a radio resource control reconfiguration message or in a medium access control (MAC) control element.

21. The network entity of claim 20, wherein the information element of the radio resource control reconfiguration message identifies a group of configurations for the mobile station or identifies a single configuration for the mobile station.

22. The network entity of claim 14, wherein the transmitted value for the threshold parameter is conveyed in an information element that includes a sidelink preconfiguration.

23. The network entity of claim 22, wherein the information element identifies a group of configurations for the mobile station or identifies a single configuration for the mobile station.

24. The network entity of claim 14, wherein the one or more processors are further configured to:
  receive additional information identifying a change to the suitability for anchoring the sidelink positioning procedure.

25. The network entity of claim 24, wherein the additional information is conveyed in an information element of a radio resource control message.

26. A method of wireless communication performed by a mobile station, comprising:
  receiving a value for a threshold parameter corresponding to a sidelink positioning procedure, wherein the threshold parameter comprises a temporal duration indicative of a threshold amount of time a threshold accuracy of a position determination is to be satisfied for the mobile station to serve as an anchor for the sidelink positioning procedure; and
  transmitting information identifying a suitability for anchoring the sidelink positioning procedure, wherein the suitability is based at least in part on the received value for the threshold parameter.

27. The method of claim 26, wherein the received value for the threshold parameter is conveyed in an information element.

28. The method of claim 26, further comprising:
- anchoring the sidelink positioning procedure based at least in part on the information indicating that the mobile station is suitable for anchoring the sidelink positioning procedure.

29. A method of wireless communication performed by a network entity, comprising:
- transmitting, to a mobile station, a value for a threshold parameter corresponding to a sidelink positioning procedure, wherein the threshold parameter comprises a temporal duration indicative of a threshold amount of time a threshold accuracy of a position determination is to be satisfied for the mobile station to serve as an anchor for the sidelink positioning procedure; and
- receiving, from the mobile station, information identifying a suitability for anchoring the sidelink positioning procedure, wherein the suitability is based at least in part on the transmitted value for the threshold parameter.

30. The method of claim 29, wherein the transmitted value for the threshold parameter is conveyed in an information element.

* * * * *